(12) United States Patent
Beaver

(10) Patent No.: US 6,231,109 B1
(45) Date of Patent: May 15, 2001

(54) MODULAR RETAINER CLIP ASSEMBLY FOR USE IN AN AUTOMOBILE

(75) Inventor: Jeffrey L. Beaver, Indianapolis, IN (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 09/433,229

(22) Filed: Nov. 4, 1999

(51) Int. Cl.[7] ........................................ B60J 3/00
(52) U.S. Cl. .................. 296/97.9; 296/214; 248/229.26; 248/231.81
(58) Field of Search ................. 296/97.9, 214; 248/229.16, 229.26, 231.81

(56) References Cited

U.S. PATENT DOCUMENTS

| 5,062,608 |   | 11/1991 | Phelps et al. ............... 248/289.11 |
| 5,242,204 |   | 9/1993  | Kiterman et al. ............ 248/289.11 |
| 5,358,299 | * | 10/1994 | Seto .............................. 296/97.9 |
| 5,403,064 | * | 4/1995  | Mahler et al. ................. 296/214 |
| 5,499,854 |   | 3/1996  | Crotty, III et al. ........... 296/97.13 |
| 5,507,545 | * | 4/1996  | Krysiak ..................... 296/97.9 X |
| 5,765,896 | * | 6/1998  | Grisval ......................... 296/97.9 |
| 5,868,370 | * | 2/1999  | Nivet ........................ 296/97.9 X |
| 5,918,927 | * | 7/1999  | Renahy et al. ............... 296/97.9 |

FOREIGN PATENT DOCUMENTS

| 37 13 425 A1 | * | 11/1988 | (DE) ......................... 296/97.9 |
| 404110224    | * | 4/1992  | (JP) .......................... 296/97.9 |
| 405096953    | * | 4/1993  | (JP) .......................... 296/97.9 |

* cited by examiner

Primary Examiner—Joseph D. Pape
Assistant Examiner—Patricia Engle
(74) Attorney, Agent, or Firm—Baker & Daniels

(57) ABSTRACT

A retainer clip assembly for securing a sun visor interiorly in an automobile. The retainer clip assembly includes a movable lever attached thereto which secures the retainer clip assembly to a vehicle ceiling panel. The lever includes a release member which is accessible from the exterior of the retainer clip, so that the lever may be disengaged and the retainer clip removed. A transportation clip is disclosed for use with the retainer clip assembly. The transportation clip connects the retainer clip to a headliner module during transportation to the final point of assembly. At the final point of assembly, the retainer clip can be pushed into its installed position and the transportation clip is concealed within the retainer clip and need not be removed.

12 Claims, 18 Drawing Sheets

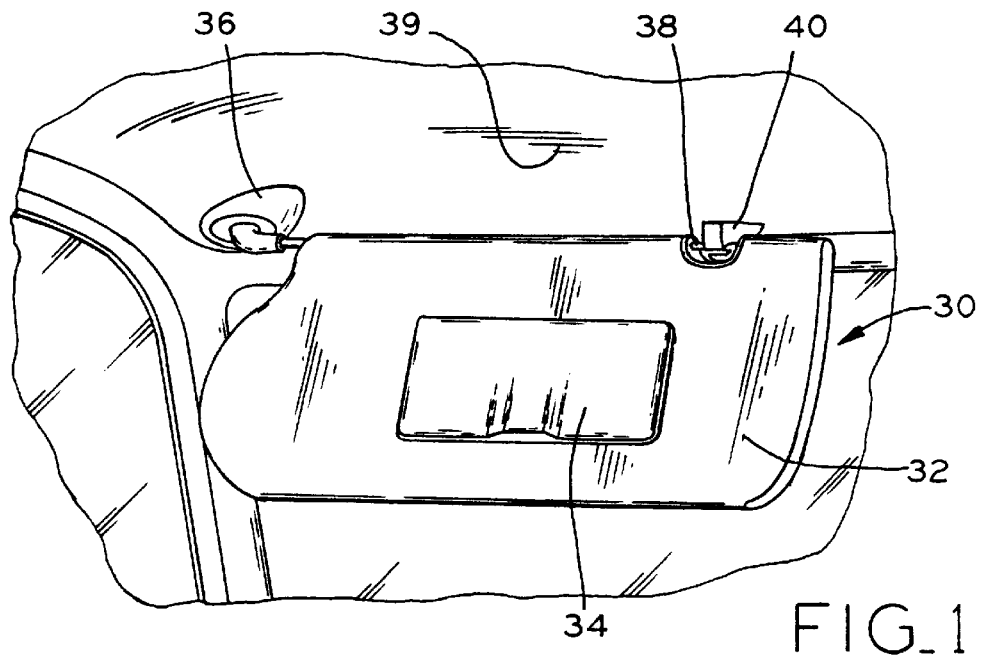
FIG_1
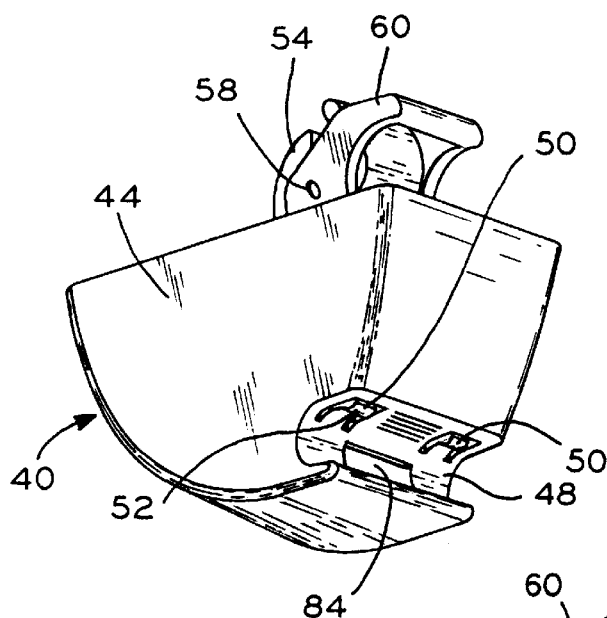
FIG_2
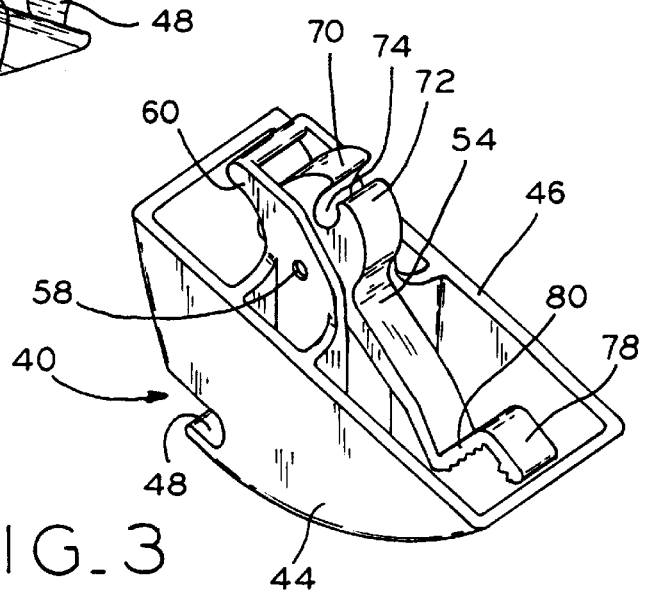
FIG_3

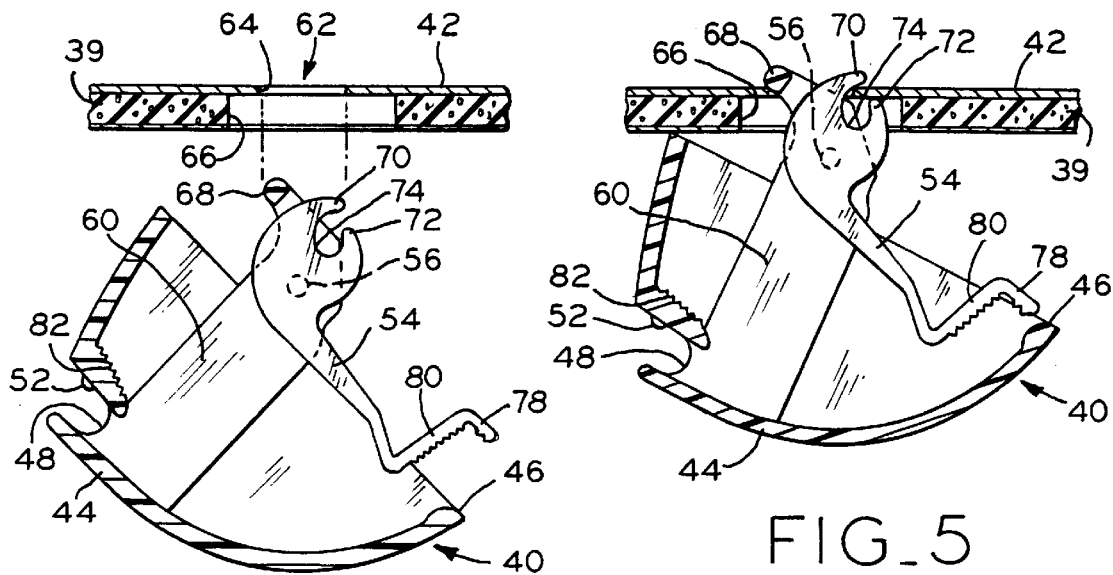
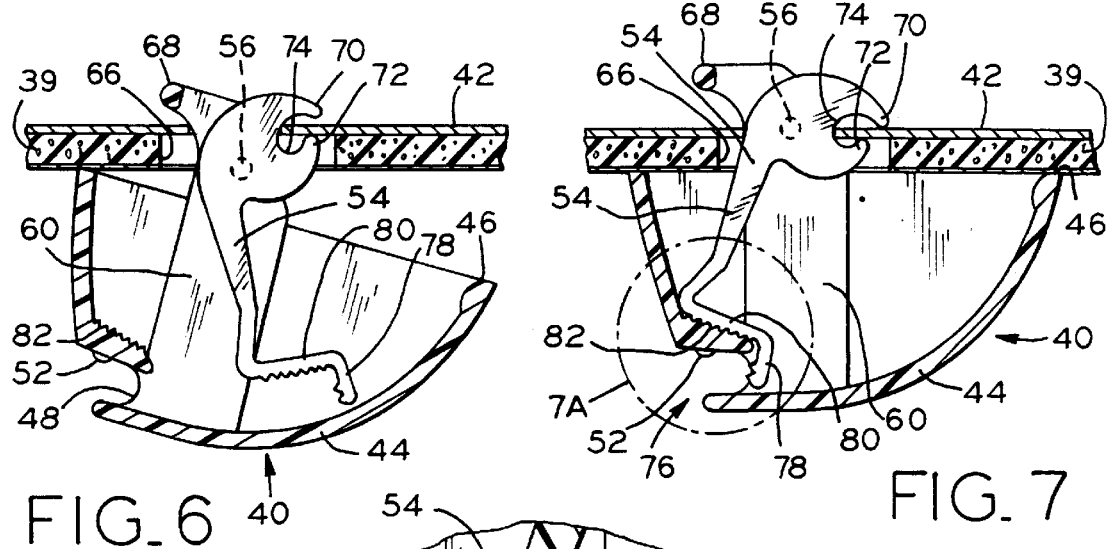
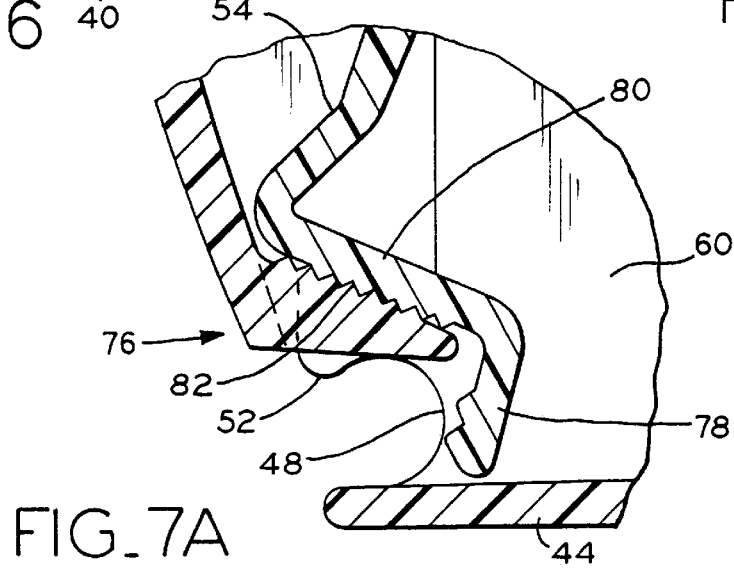

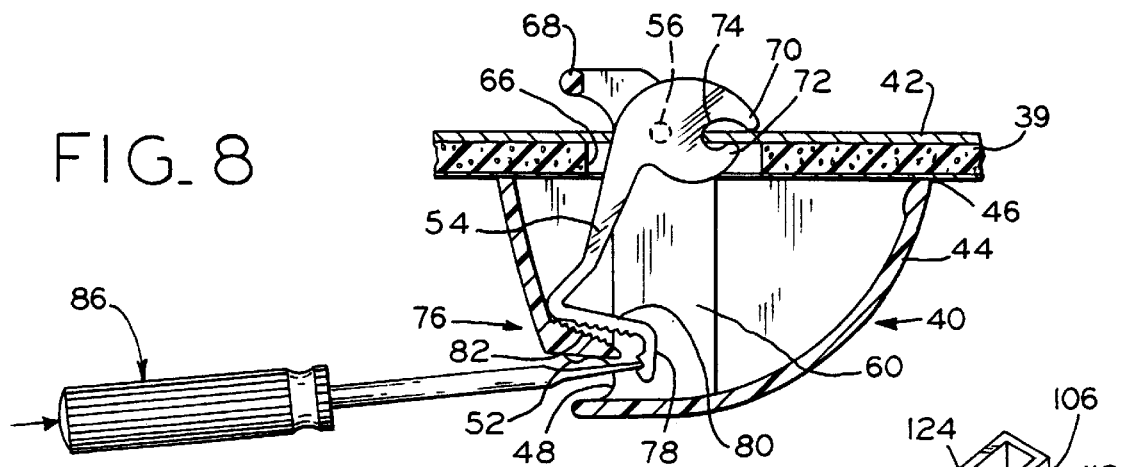
FIG_8
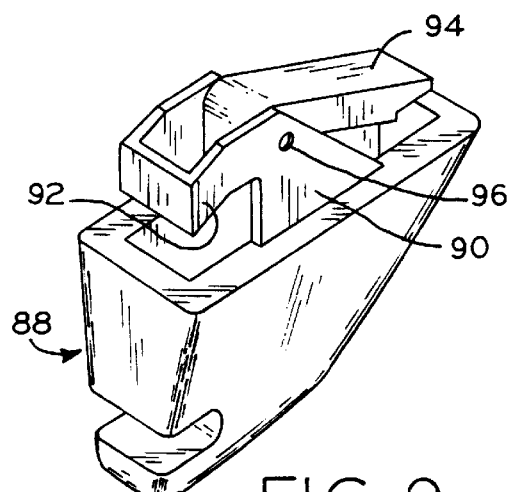
FIG_9
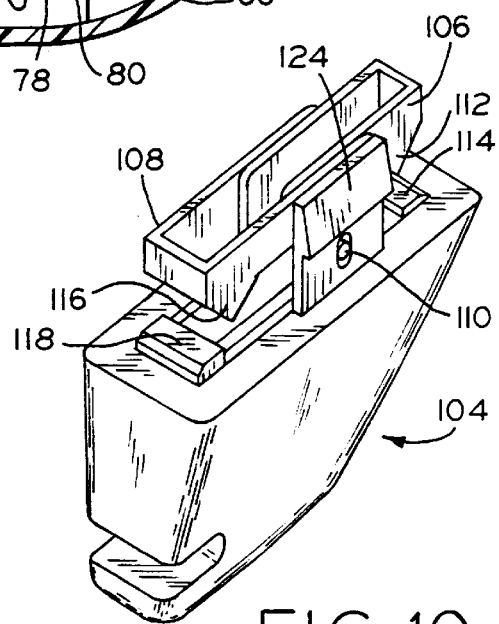
FIG_10
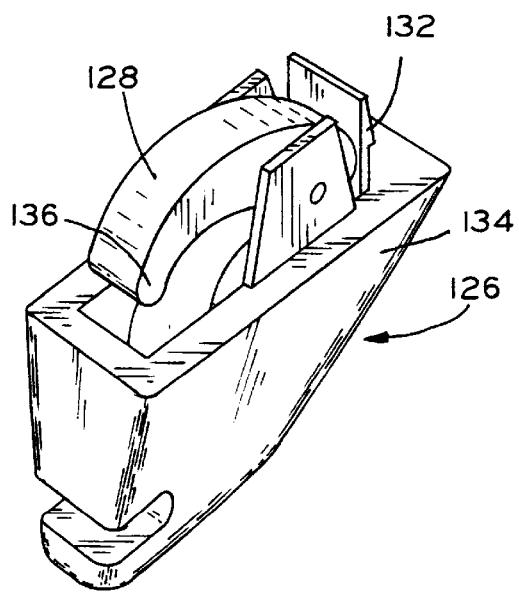
FIG_11
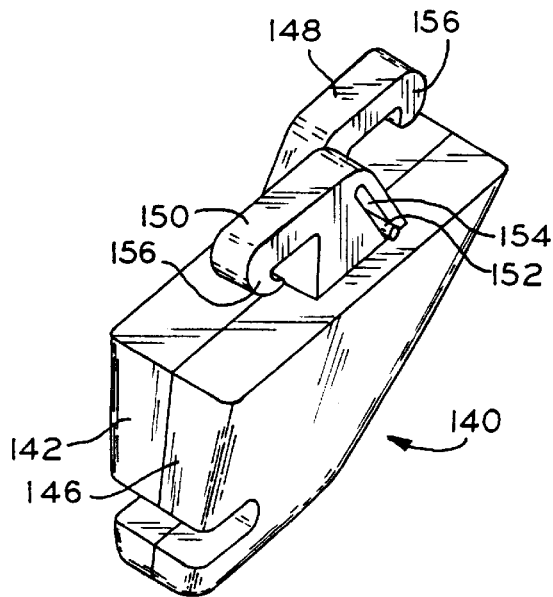
FIG_12

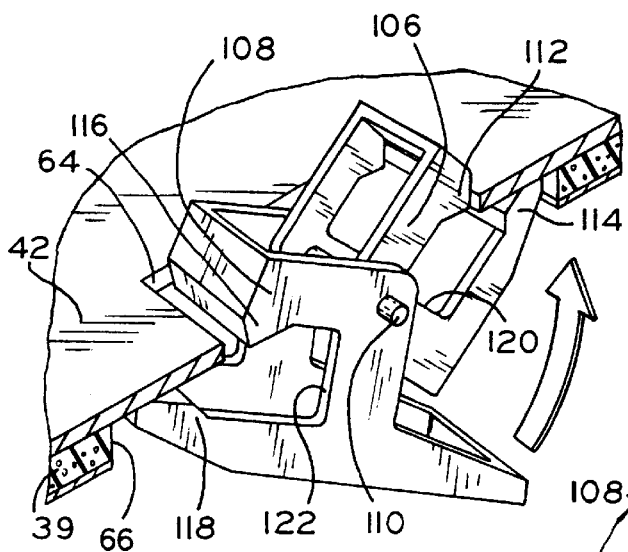
FIG_17
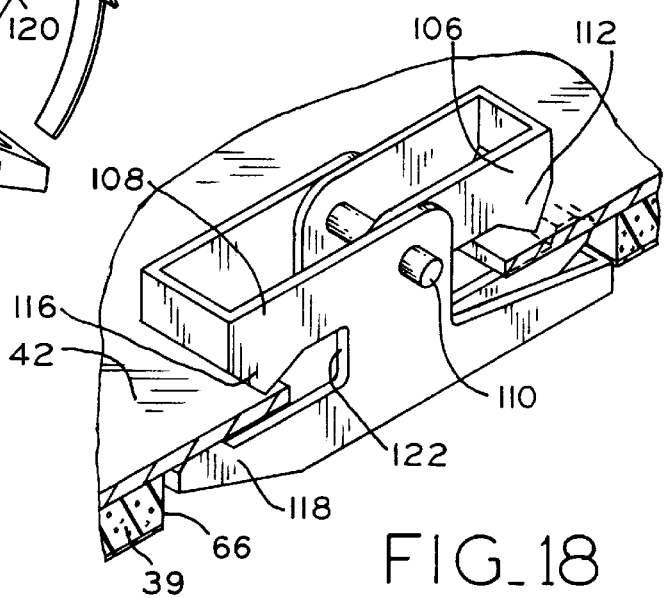
FIG_18
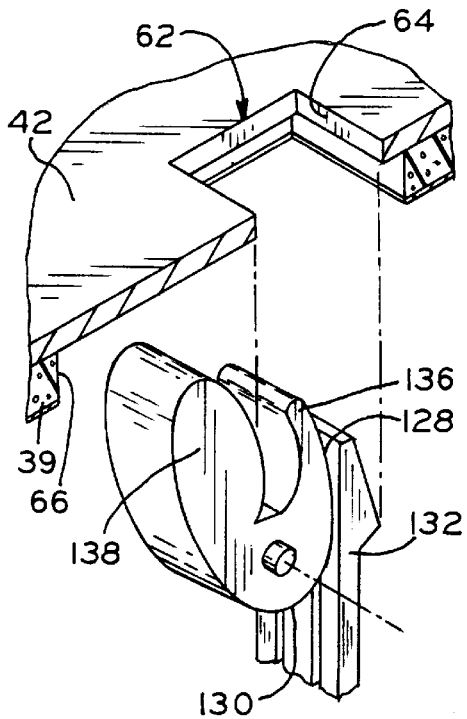
FIG_19
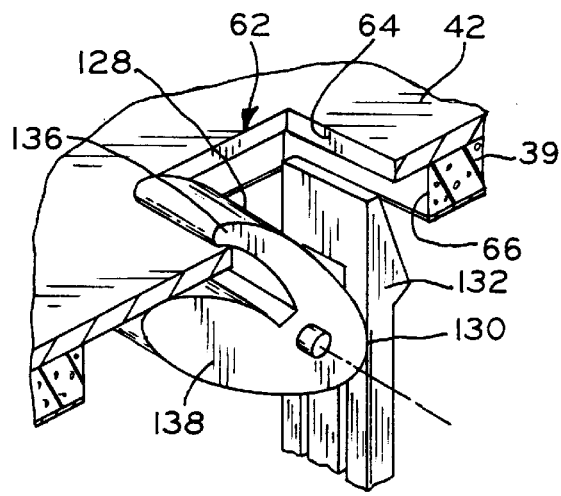
FIG_20

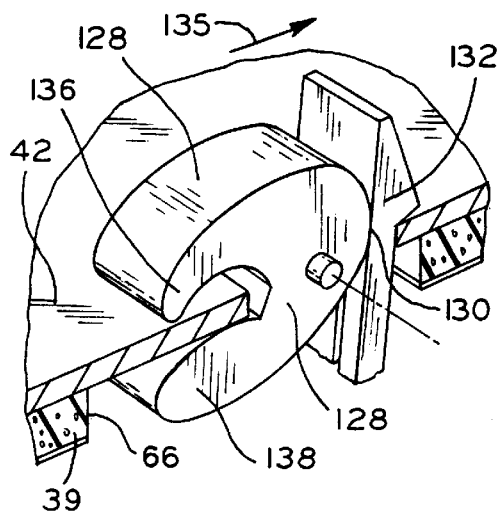
FIG_21
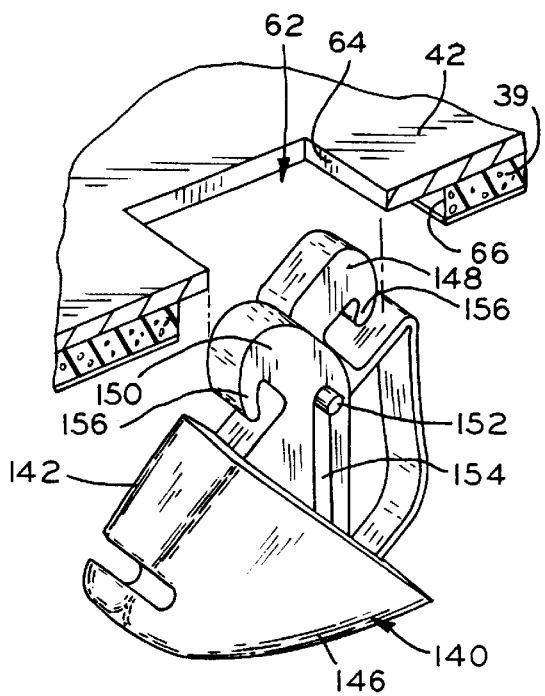
FIG_22
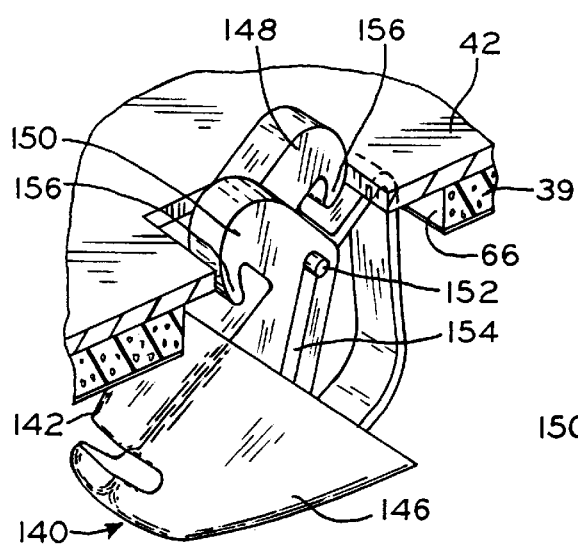
FIG_23
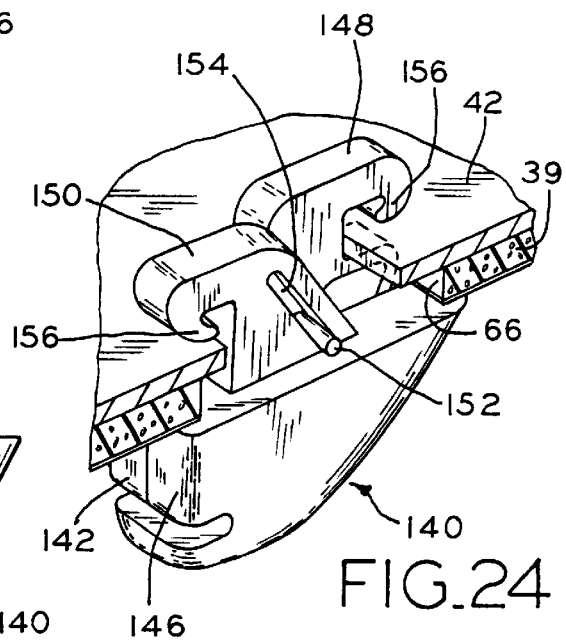
FIG_24
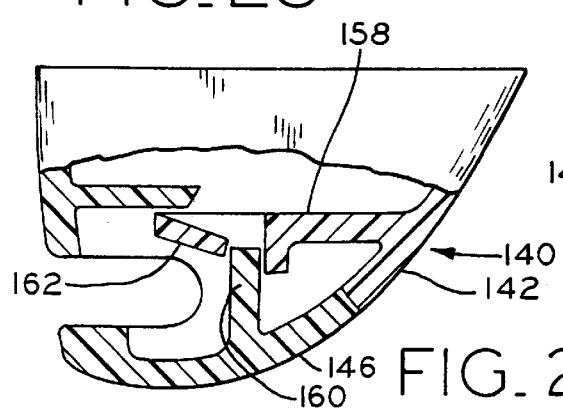
FIG_24A

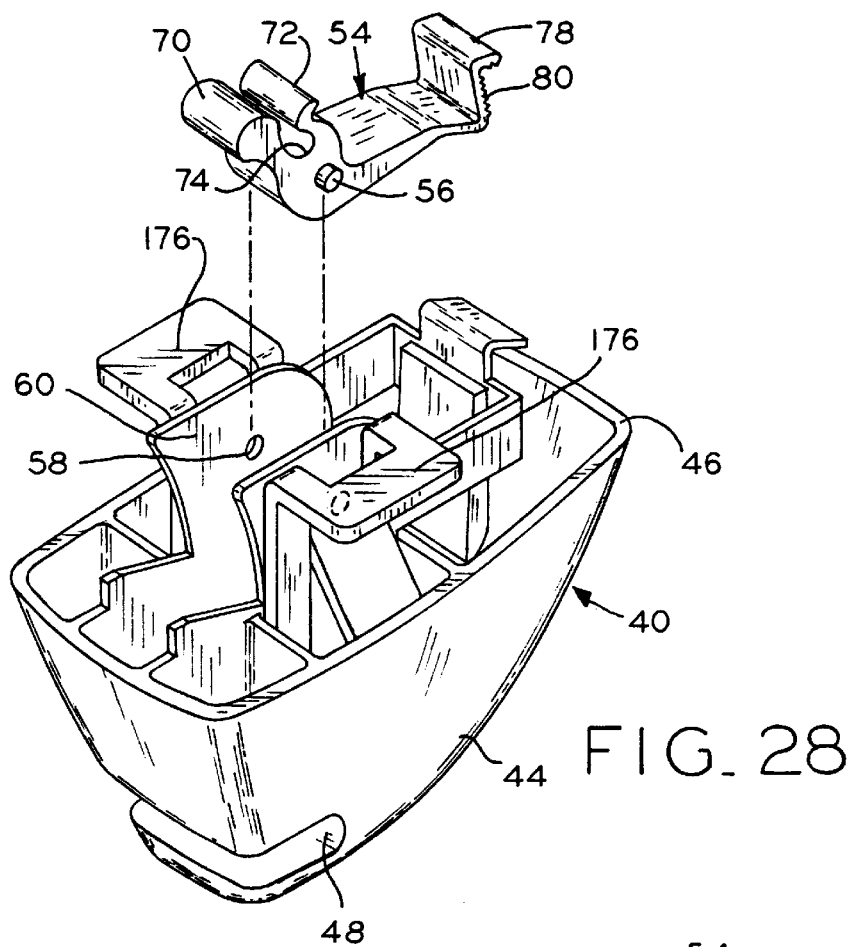
FIG_28
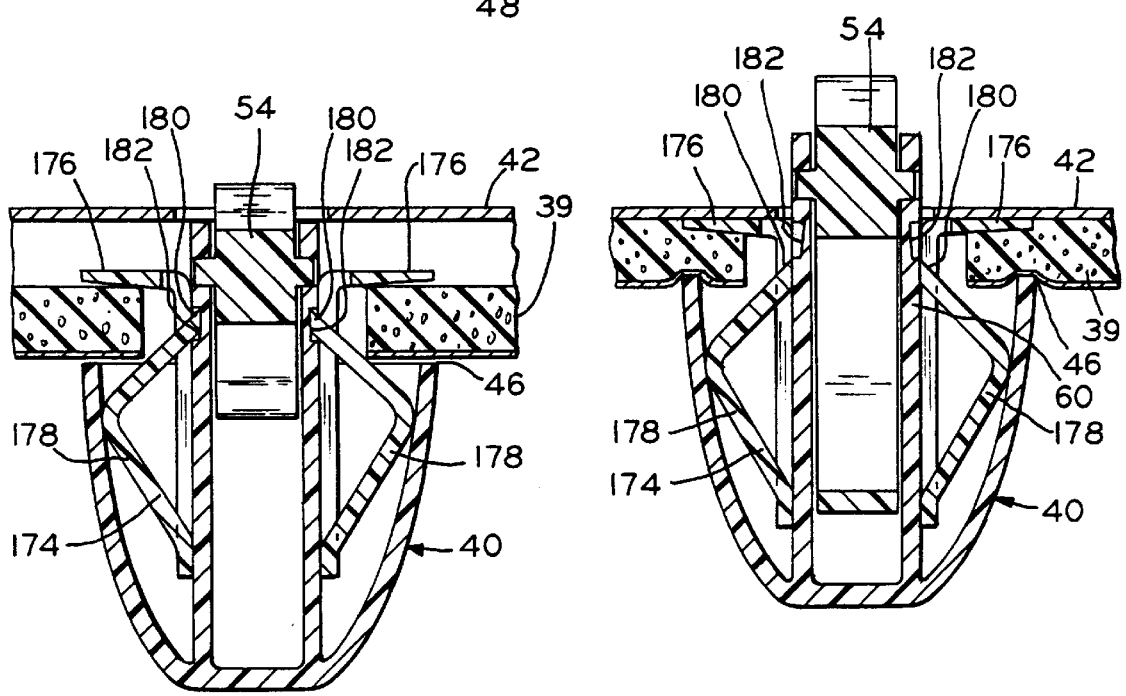
FIG_29  FIG_30

FIG_40

FIG_41

MODULAR RETAINER CLIP ASSEMBLY FOR USE IN AN AUTOMOBILE

BACKGROUND OF THE INVENTION

The present invention relates generally to automobile modules, and in particular, to a modular retainer clip assembly for use in an automobile module which will ultimately become part of an assembled automobile.

Sun visors for vehicles are typically mounted on the vehicle body ceiling panel by a bracket assembly that provides both a horizontal axis about which a visor blade pivots between a storage position adjacent the vehicle headliner and a use position adjacent the windshield, and a generally vertical axis about which the visor pivots between a forward windshield position and a side window position. The need to use fasteners and tools, either powered or hand driven, in the installation into vehicles of many existing sun visor mounting bracket assemblies and retainer clips is undesirable for a number of reasons. For example, in addition to diminishing the aesthetics of the finished product, fasteners may be more labor intensive to install and therefore expensive to employ. Fasteners may also be costly as well as potentially damaging to the vehicle.

A variety of sun visor mounting assemblies have been developed, such as those disclosed and described in U.S. Pat. Nos. 5,062,608, 5,242,204 and 5,499,854. U.S. Pat. No. 5,499,854 is owned by the assignee of the present invention, the disclosure of which is hereby incorporated by reference.

While the above-mentioned art was suitable for its intended purpose, new manufacturing methods are revolutionizing the way car makers produce automobiles. In particular, the automobile industry is moving toward "modular manufacturing," which is an efficient outsourcing scheme which promises to shave thousands of dollars from the cost of building each car. In brief, modular manufacturing is a system whereby individual suppliers provide the automobile manufacturer/assembler with one or more "modules." For example, a front end module may include the main frame carrier, the bumper beam, the engine cooling system and the lighting system. Other modules could include chassis, axles and suspension, tire/wheels, or engine/transmission.

A headliner module can include the headliner, typically a compression molded piece with a cloth cover, cloths hanger hooks, grab handles and the entire sun visor assembly. The sun visor assembly includes the sun shade, the wiring, the clips, the rotating brackets, etc.

It is desirable to provide a retainer clip assembly adapted to be easily transported as part of a module and easily installed by the end assembler of the automobile.

SUMMARY OF THE INVENTION

The present invention provides a retainer clip assembly which can be easily transported with a larger module and easily installed to the module as part of the final assembly of the automobile. The inventive retainer clip assembly utilizes a lever movably attached to the retainer clip body. The lever fits through an opening extending through the ceiling panel of the module and secures the retainer clip thereto. The invention also provides a transportation clip which connects the retainer clip to the headliner during transportation of the module.

In one form thereof, the present invention provides an automobile interior assembly. The assembly includes a ceiling panel and a retainer clip releasably secured to the ceiling panel. The retainer clip defines a notch. The retainer clip includes a release member accessible exteriorly of the retainer clip, whereby engagement of the release member disengages the retainer clip from the ceiling panel.

In a preferred form thereof, the retainer clip includes a lever movably attached thereto, the lever securing the retainer clip to the ceiling panel. The lever defines the release member and the ceiling panel defines an opening therethrough. The lever engages the ceiling panel proximate an edge of the opening. Conveniently, the lever is concealed by the retainer clip and the ceiling panel.

In another form thereof, the present invention provides a retainer clip for use in an automobile, the automobile including a rigid panel having a headliner adjacent thereto, and an opening extending through the panel and headliner for insertion of the retainer clip. The retainer clip comprises a retainer clip body defining an edge adapted to abut the headliner, the retainer clip further defining a notch. A lever is movably attached to the retainer clip. The lever is positionable in a first position wherein the lever is adapted for insertion into the opening and a second position wherein the lever engages the rigid panel thereby securing the retainer clip.

In a preferred form thereof, the lever further comprises a release member accessible from outside of the retainer clip, whereby the retainer clip can be removed. The retainer clip body forms an access hole therethrough for accessing the release member. The lever further includes a slot adapted to receive a portion of the rigid panel proximal to the opening. The lever includes a slot defined by a pair of projections, at least one of the projections adapted to engage the rigid panel.

In yet another form thereof, the present invention provides an automobile interior assembly. The assembly comprises a headliner defining an opening therethrough, a retainer clip having a notch for releasably receiving a rod of a vehicle sun visor, and a transportation clip disposed in the opening. The transportation clip includes a flange and a catch member. The retainer clip is positionable by the transportation clip in a pre-installed position, wherein the flange hooks the transportation clip to the headliner and the catch member releasably retains the retainer clip.

In a preferred form, the assembly further comprises a rigid panel positioned adjacent the headliner. The retainer clip is further positionable in an installed position, wherein in the installed position, the catch member is disengaged from the retainer clip and the transportation clip is maintained with and concealed by the retainer clip. The flange member is sandwiched between the headliner and the rigid panel in the installed position.

In another preferred form, the retainer clip further comprises a lever movably attached thereto, the lever movable between a first position wherein the lever is adapted for insertion into the opening and a second position corresponding to the installed position wherein the lever secures the retainer clip and the transportation clip to the headliner and the rigid panel. A release member is accessible exteriorly of the retainer clip, whereby said retainer clip can be removed from said assembly.

One advantage of the present invention is that it provides a retainer clip assembly which can be transported as part of a larger module.

Another advantage of the present invention is that the transportation clip provided for transporting the retainer clip with the module need not be removed prior to final installation of the retainer clip. Advantageously, this reduces material waste and accelerates the assembly process.

Yet another advantage of the present invention is that the locking mechanism and associated release member provides a convenient mechanism for installing the retainer clip yet allowing removal thereof at a later time. Conventionally, interior components of an automobile snap into place during initial installation, but are difficult to remove, and often break in the event that they are removed. The release member of the present invention avoids this problem.

Yet another advantage of certain embodiments of the present invention is that a tactile sensation and an audible clicking sound are provided when the retainer clip is correctly installed. Thus, a greater percentage of clips in accordance with the present invention will be properly installed.

Still another advantage of the present invention is that both the lever and the transportation clip are concealed within the confines of the housing of the retainer clip, so that the retainer clip is both functional and attractive.

Still another advantage of the present invention is that the transportation clip can be flat molded, then bent or formed into shape, thereby reducing tooling and manufacturing costs.

BRIEF DESCRIPTION OF THE DRAWINGS

The above-mentioned and other advantages and objects of this invention, and the manner of attaining them, will become more apparent and the invention itself will be better understood by reference to the following description of embodiments incorporating the invention taken in conjunction with the accompanying drawings, wherein:

FIG. 1 is a fragmentary perspective view of an interior portion of an automobile which includes the vehicle headliner, sun visor assembly, and inventive retainer clip in accordance with the present invention;

FIG. 2 is a perspective view of a retainer clip in accordance with the present invention;

FIG. 3 is a second perspective view of the retainer clip shown in FIG. 2 taken from a different angle;

FIG. 4 is a side sectional view illustrating the relationship of the retainer clip of FIG. 2 with the panel and headliner of an automobile;

FIGS. 5–7 show a sequence of steps for the installation of the retainer clip shown in FIG. 3 into the interior of an automobile;

FIG. 7A is an enlarged fragmentary cross-sectional view of the portion indicated in FIG. 7;

FIG. 8 is a side sectional view illustrating the disengagement of the release member of an embodiment of the present invention;

FIG. 9 illustrates an alternate embodiment of a retainer clip in accordance with the present invention;

FIG. 10 illustrates another embodiment of a retainer clip in accordance with the present invention;

FIG. 11 illustrates yet another embodiment of a retainer clip in accordance with the present invention;

FIG. 12 illustrates yet another embodiment of a retainer clip in accordance with the present invention;

FIGS. 16–18 shown a sequence of steps for the installation of the retainer clip of FIG. 10 into an automobile interior;

FIGS. 19–21 show a sequence of steps for the installation of the retainer clip of FIG. 11 into an automobile interior;

FIGS. 22–24 illustrate a sequence of steps for the installation of the retainer clip of FIG. 12 into an automobile interior;

FIG. 24A is a fragmentary cross-sectional view of the retainer clip of FIG. 12 which illustrates the locking mechanism;

FIG. 28 is a perspective view illustrating the transportation clip of FIG. 25 fully installed into the retainer clip of FIG. 27;

FIG. 29 is a cross sectional view illustrating the retainer clip and transportation clip in accordance with an embodiment of the present invention in a pre-installation position.

FIG. 30 is a cross sectional view of the retainer clip and a transportation clip in accordance with an embodiment of the present invention shown in an installed position;

Figure 13:
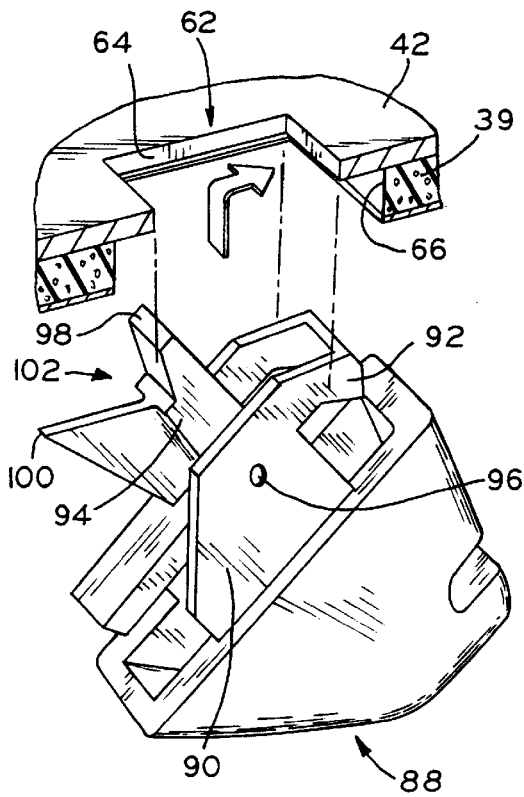
FIGS. 13–15 illustrate a sequence of steps for the installation of the retainer clip of FIG. 9 into an automobile interior.
Figure 14:
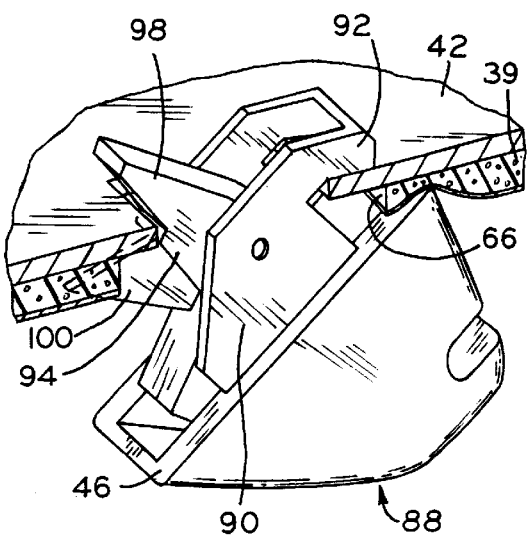

Corresponding reference characters indicate corresponding parts throughout the several views. Although the drawings represent embodiments of the invention, the drawings are not necessarily to scale and certain features may be exaggerated in order to better illustrate and explain embodiments incorporating the present invention.

DETAILED DESCRIPTION OF EXEMPLARY EMBODIMENTS

Referring now to FIG. 1, there is shown a vehicle interior including sun visor assembly 30, which further includes sun shade 32, vanity mirror 34, connecting bracket 36, sun visor rod 38 which is releasably received by retainer clip 40. Retainer clip 40 is secured to headliner 39 and a rigid interior panel 42 (FIG. 4). The headliner and rigid panel are collectively referred to herein as a "ceiling panel."

With reference to FIGS. 2–7, a retainer clip in accordance with an exemplary embodiment of the present invention can be understood. Retainer clip 40 includes a housing member 44 which forms a retainer clip body. The housing member defines an edge 46 adapted to abut the exposed side of headliner 39. Housing member 44 further defines a notch 48 for releasably receiving rod 38 of sun visor assembly 30. As seen in FIG. 2, housing member 44 includes a pair of fingers 50 integrally formed with housing member 44. Housing member 44 is formed of a polymer material, such as polyethylene, polypropylene or other suitable polymer. Fingers 50 are depressed inwardly as rod 38 is received into notch 48 and serve to maintain sun visor 30 in the position shown in FIG. 1. Sun visor 30 can pivot about a longitudinal axis of rod 38 as is conventional for sun visors for providing shade. Fingers 50 include a rounded portion 52 at a distal end thereof so that rod 38 "snaps" into place and so that a tactile indication is provided to the vehicle user that the rod 38 is snapped into place within notch 48.

Lever 54 is movably attached to housing member 44 by means of a pair of cylindrical pegs 56 (FIG. 28) extending from lever 54 which insert into a corresponding pair of cylindrical bores 58 (FIG. 28), which in turn are formed in a corresponding pair of beams 60 depending upwardly from the interior of housing member 44.

Lever 54 is movable to a first position wherein the lever is adapted for insertion into opening 62 which extends through panel 42 and headliner 39 as seen in FIG. 4. Opening 62 is a two-tiered opening comprising a smaller panel section 64 and a larger headliner section 66. Beam 60 includes a cylindrical nub 68 extending from a distal portion thereof which serves to guide retainer clip 40 through opening 62. As shown in FIG. 5, lever 54 includes a pair of projections 70 and 72 at its distal end, and the projections define a slot 74 therebetween for receiving a portion of panel 42.

FIG. 7 illustrates a second position of lever 54 in which projection 70 of lever 54 abuts panel 42 which helps secure retainer clip 40 to the headliner and panel. Movement of lever 54 from its first to its second position can be appreciated with reference to the sequence of movement depicted in FIGS. 4–7. As most clearly in FIG. 7, lever 54 and edge 46 of clip 40 effectively sandwich panel 42 and headliner 39 therebetween in the second position of lever 54. With reference to FIGS. 7 and 8, and in particular FIG. 7A, locking mechanism 76 including release member 78 is illustrated. Lever 54 includes ratchet member 80 disposed thereon in the shape of a saw-toothed edge. Housing member 44 defines pawl member 82 which also is formed as a saw-toothed edge. Ratchet member 80 engages pawl member 82 thereby locking lever 54 in the second position, which in turn secures retainer clip 40 to the interior of the vehicle. It should now be appreciated that retainer clip 40 can easily be inserted and secured into the vehicle by simply inserting the guide nub 68 into opening 62 and pushing the clip into place by hand. In so doing, the clip automatically locks into place as the lever automatically moves to its second position.

As shown in FIG. 2, notch 48 of housing 44 forms an access hole 84 therethrough for accessing release member 78. As shown in FIG. 8, implement 86, such as a screw driver or scratch awl, can be positioned to engage release member 78 through access hole 84 for disengaging lever 54 from the second position, and in turn enabling retainer clip 40 to be removed.

Figure 15:
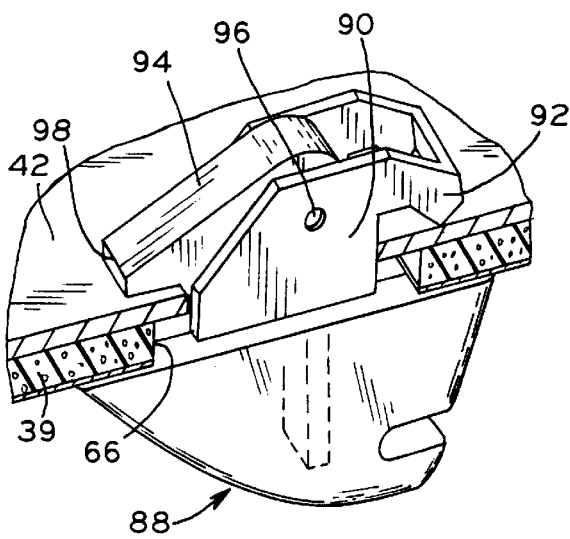
Figure 16:
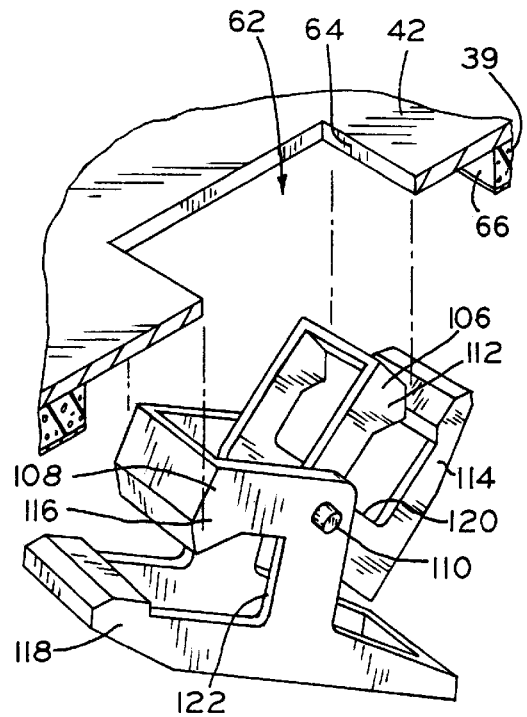

With reference to FIG. 9 and FIGS. 13–15, a second embodiment of a retainer clip in accordance with the present invention is illustrated. Retainer clip 88 includes bracket 90 having arm member 92 extending therefrom. Similar to the first embodiment described above, lever 94 is movably attached to bracket 90 by means of a pair of cylindrical pegs extending into bores 96. With reference to FIG. 13, lever 94 includes a pair of projections 98 and 100 which define a V-shaped slot 102 therebetween. With reference to FIG. 15, projection 98 abuts against panel 42 whereas arm member 92 of bracket 90 abuts against panel 42 on the opposite side of the opening 62. A locking mechanism (not shown for the embodiment depicted in FIG. 9 and FIGS. 13–15) such as that provided for the above-described first embodiment is provided to maintain lever 94 in its second position, thereby securing the retainer clip to the vehicle interior.

FIG. 10 and FIGS. 16–18 illustrate a third embodiment incorporating the present invention. Retainer clip 104 includes a pair of levers 106 and 108 pivotable about pin 110 disposed within corresponding bores through levers 106 and 108. Each lever 106, 108 includes a pair of projections 112, 114 and 116, 118, each of which defines a square slot 120, 122, respectively, therebetween. As shown in FIG. 10, the locking mechanism which secures levers 106 and 108 into their second position is formed of a pair of latch members 124 (only one of which is shown in FIG. 10) which engage panel 42 as clip 104 is pressed upwardly into opening 62. The installation of retainer clip 104 can be appreciated with reference to the sequence depicted by FIGS. 16–18.

FIG. 11 and FIGS. 19–21 illustrate a fourth embodiment of the retainer clip incorporating the present invention. Retainer clip 126 includes lever 128 having cam surface 130 which cammingly engages latch member 132 which extends from housing member 134. As shown in FIGS. 20–21, the retainer clip is pushed upwardly which results in camming surface 130 engaging latch member 132 and pushing latch member 132 in the direction of arrow 135 which thereby secures retainer clip 126. Lever 128 includes projections 136, 138 projection 136 abutting against panel 42 when lever 128 is in its second position.

FIG. 12 and FIGS. 22–24 illustrate a fifth embodiment of a retainer clip embodying the present invention. With reference to FIG. 12, retainer clip 140 is formed of two housing members 142 and 146. Levers 148 and 150 are integrally formed with housing members 142 and 146, respectively. A pivot pin 152 is slidably disposed in corresponding slots 154 (only one of which is shown) formed in levers 148 and 150.

As illustrated in FIGS. 22–24, as retainer clip 140 is inserted into opening 62 defined by panel 42 and headliner 39, housing members 142 and 146 pivot relative to one another while pivot pin 152 slides downwardly in corresponding slots 154. Projections 156 disposed on each of levers 148 and 150 abut against panel 42 in the second position of levers 148 and 150 as shown in FIG. 24. A locking mechanism for clip 140 is shown in FIG. 24A. Housing member 142 includes internally disposed latch member 158 which engages internally disposed catch member 160 which is integrally formed with housing member 146. Release member 162 can be accessed through an access opening disposed in the notch as described above with reference to the first described embodiment.

Figure 31:
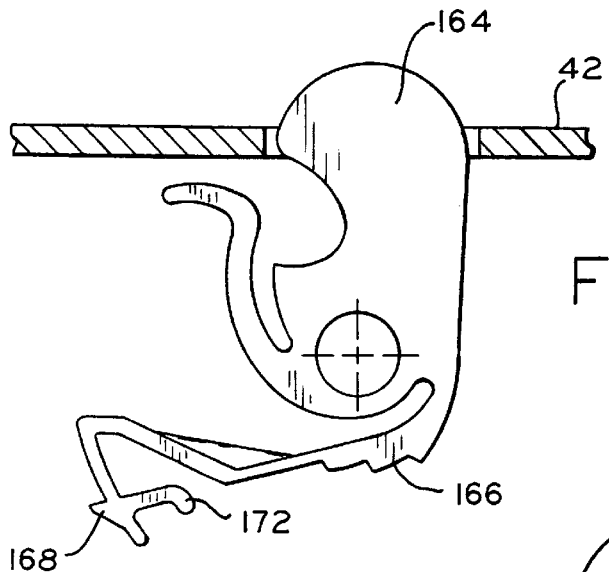
FIG. 31 is a side elevational view in partial cross section illustrating another embodiment of a lever in accordance with an embodiment of the present invention.
Figure 32:
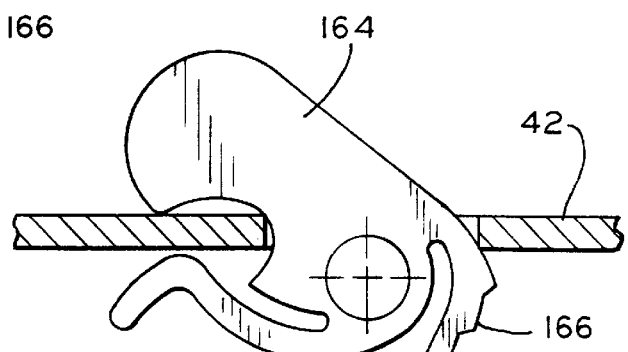
FIG. 32 is a side elevational view in partial cross section illustrating installation of the lever shown in FIG. 31 into a vehicle interior.

FIGS. 31 and 32 illustrate a sixth embodiment incorporating the present invention wherein lever 164 includes latch member 166 formed as a saw-toothed surface which engages panel 42. As shown in FIG. 32, lever 164 includes ratchet member 168 which engages pawl member 170 defined by the interior of the retainer clip housing. Release member 172 is accessible through an access opening in the notch which receives the sun visor rod in order to release the retainer clip.

Figure 25:
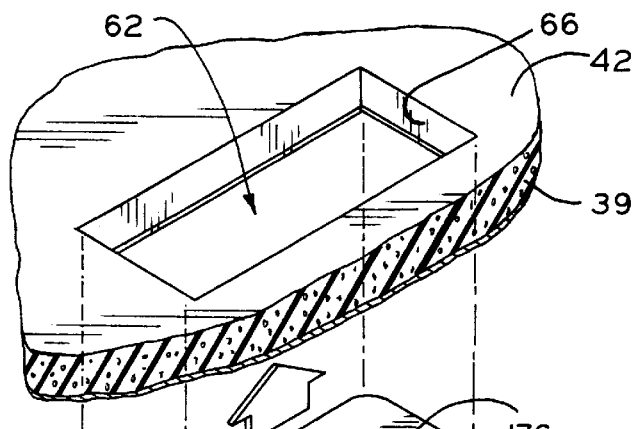
FIG. 25 is a perspective view exploded away illustrating the relationship of a transportation clip in accordance with the present invention, and a vehicle headliner.
Figure 26:
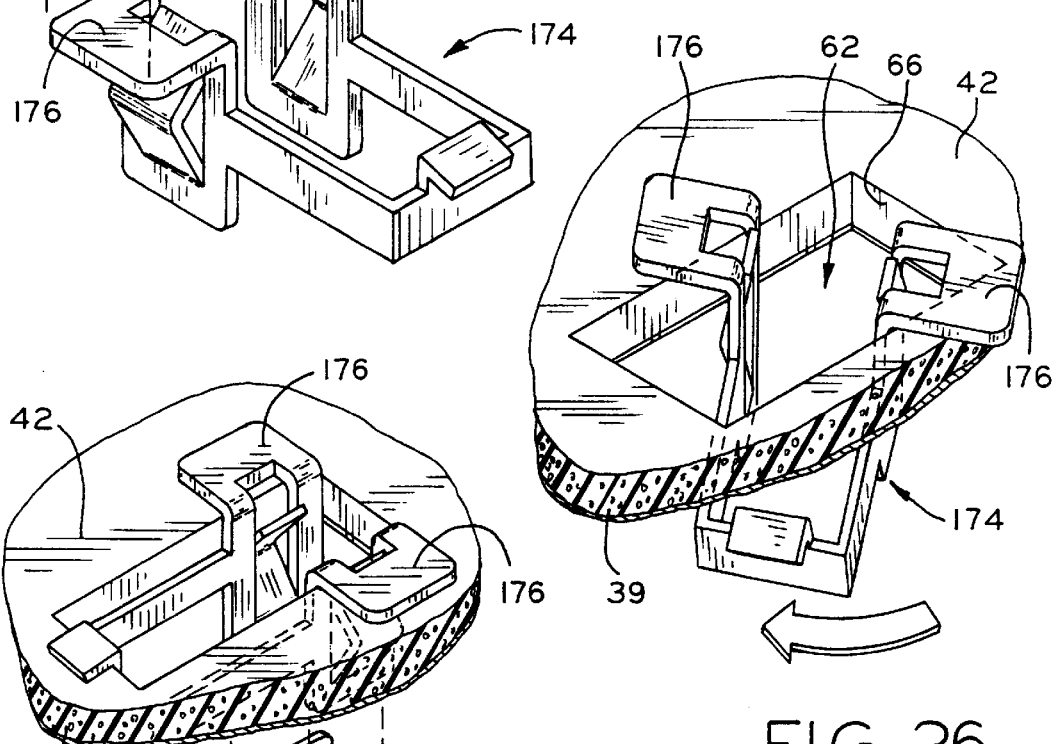
FIG. 26 is a perspective view illustrating the installation of the transportation clip of FIG. 25 into an opening provided through a headliner.
Figure 27:
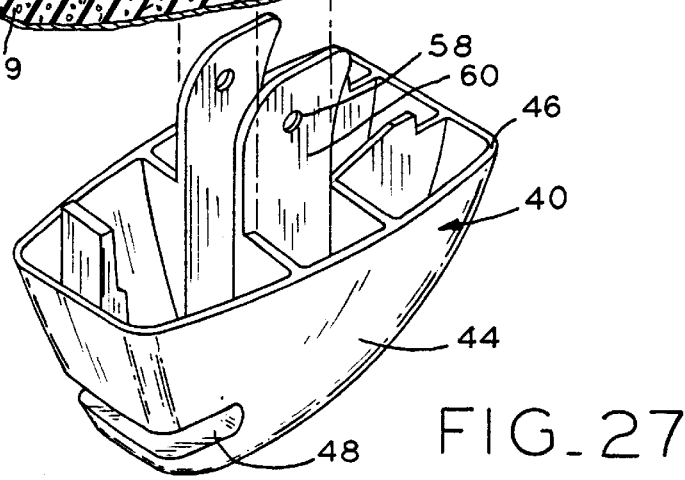
FIG. 27 is a perspective view exploded away illustrating the relationship of the transportation clip of FIG. 25 and a retainer clip.

With reference to FIG. 25, transportation clip 174 is used in a transportable automobile module which includes headliner 39, transportation clip 174 and retainer clip 40. Headliner 39 will be placed adjacent rigid panel 42 during final assembly of the vehicle. Transportation clip 174 can be "pre-installed" into opening 66 in headliner 39 by positioning flange members 176 of transportation clip 174 in alignment with headliner opening section 66 as shown in FIG. 25. As shown in FIG. 26, transportation clip 174 is then rotated within headliner opening section 66 to the position shown in FIG. 27 where it is hooked to the headliner in a "pre-installation" position. Transportation clip 174 engages retainer clip 40 in the pre-installation position so that the module can be transported with the retainer clip connected to the headliner.

The engagement of retainer clip 40 with transportation clip 174 in both the pre-installation and installed positions can be appreciated with reference to FIGS. 29 and 30. As shown in FIG. 29, transportation clip 174 includes web members, or catch members 178, having ends 180 thereof which extend into recesses 182 formed on opposite sides of retainer clip 40. In this position, retainer clip 40 is connected to transportation clip 174 and transportation clip 174 is hooked to headliner 39 by means of flange members 176 as shown in FIG. 29.

With reference to FIG. 30, when retainer clip 40 is pushed upwardly into the opening defined by the headliner and panel, transportation clip 174 is forced downwardly into retainer clip 40. That is, ends 180 disengage from recesses 182 and slide along beam 60 of housing 44. Meanwhile, lever 54 engages panel 44 as described hereinabove with reference to the first embodiment. With further reference to FIG. 30, the installed position includes the flange members 176 being sandwiched between headliner 39 and panel 42. Conveniently, transportation clip 174 is concealed within retainer clip 40 in the installed position so that transportation clip 174 need not be removed.

Figure 33:
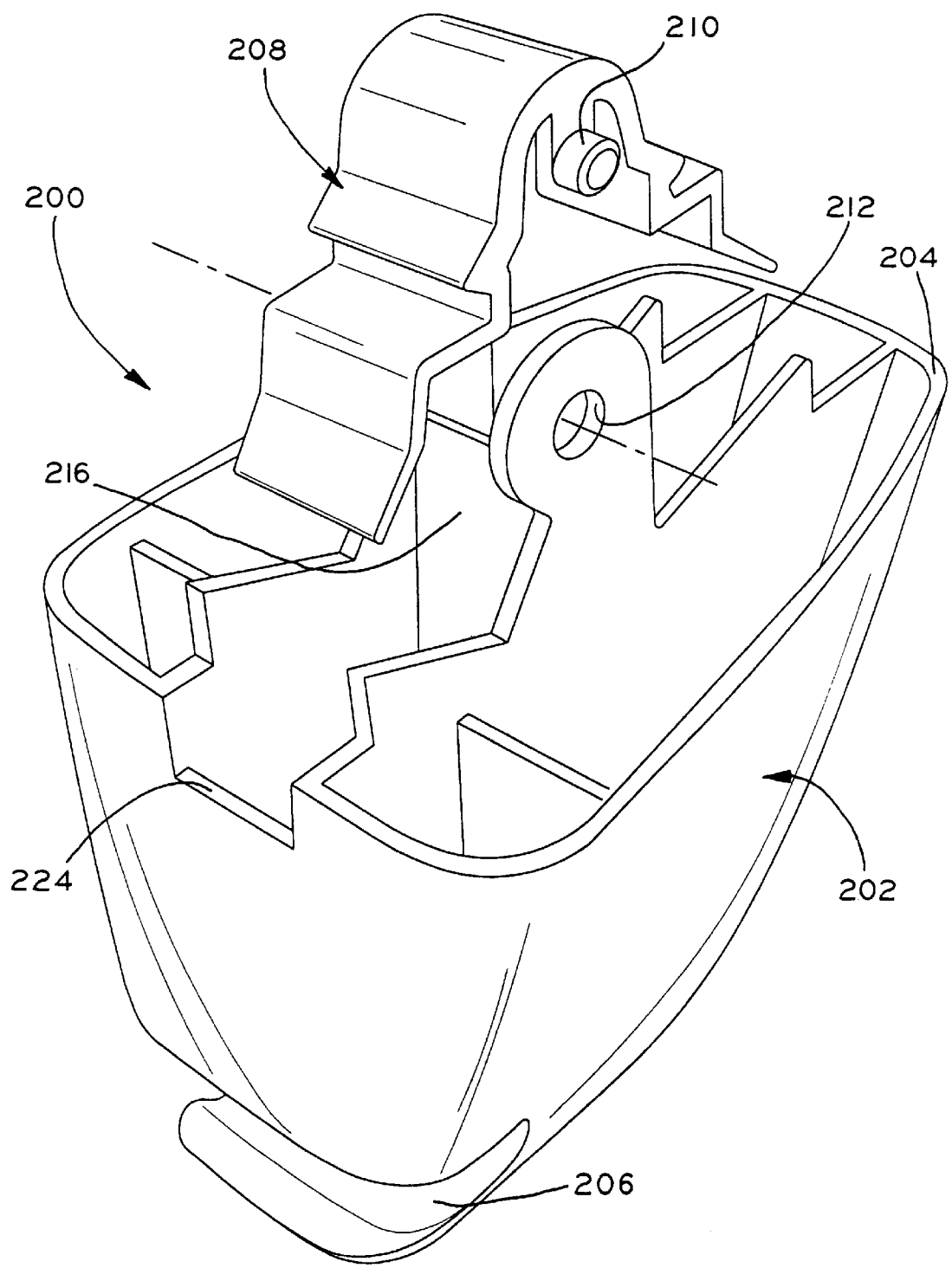
FIG. 33 is a perspective view of an alternate embodiment of a retainer clip in accordance with the present invention.

FIG. 33–37 illustrate a seventh embodiment of a retainer clip embodying the present invention. With reference to FIG. 33, retainer clip 200 includes a housing member 202 which forms a retainer clip body. The housing member defines an edge 204 adapted to abut the exposed side of headliner 39. Retainer clip body 202 further defines a notch 206 for releasably receiving rod 38 of sun visor assembly 30.

Figure 37:
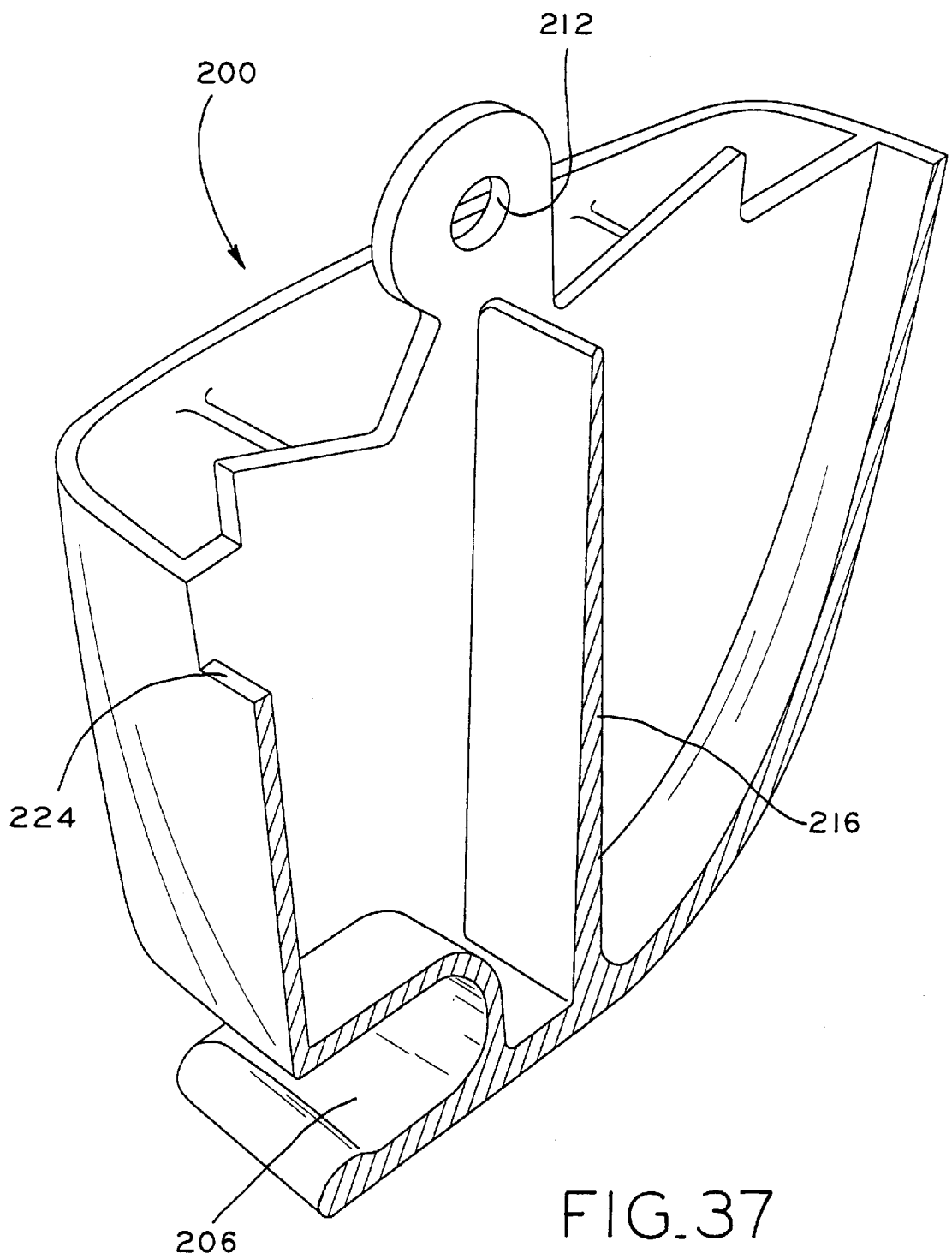
FIG. 37 is a perspective view in partial cross section which illustrates the beam member of the retainer clip of FIG. 33.

Lever 208 is movably, more specifically, pivotably, attached to retainer clip body 202 by means of a pair of cylindrical pegs 210 extending from lever 208 which insert into a corresponding pair of cylindrical bores 58 (FIG. 28) disposed in a pair of plates 214 depending upwardly from the interior of the retainer clip body, which in turn are connected by beam 216. As shown in FIG. 37, beam 216 acts as a stop for lever 208, preventing lever 208 from rotating 360 degrees.

Figure 34:
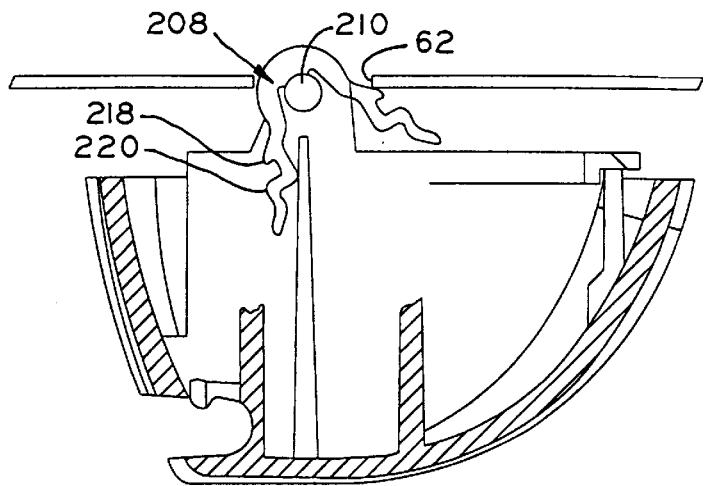
FIGS. 34–36 show a sequence of steps for the installation of the retainer clip shown in FIG. 33 into the interior of an automobile.
Figure 35:
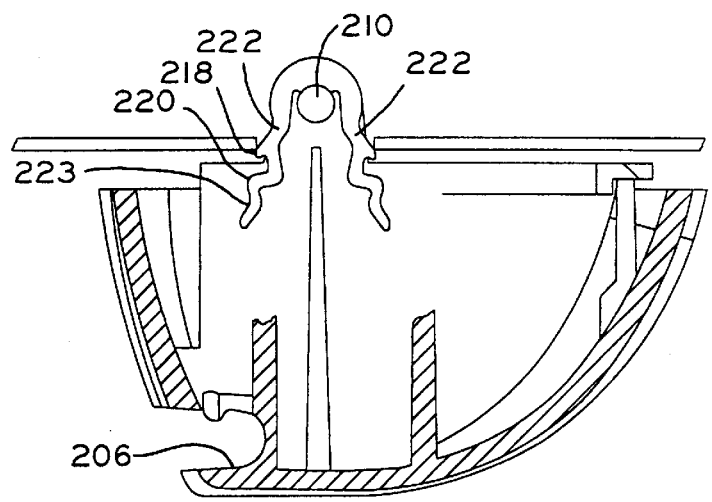
Figure 36:
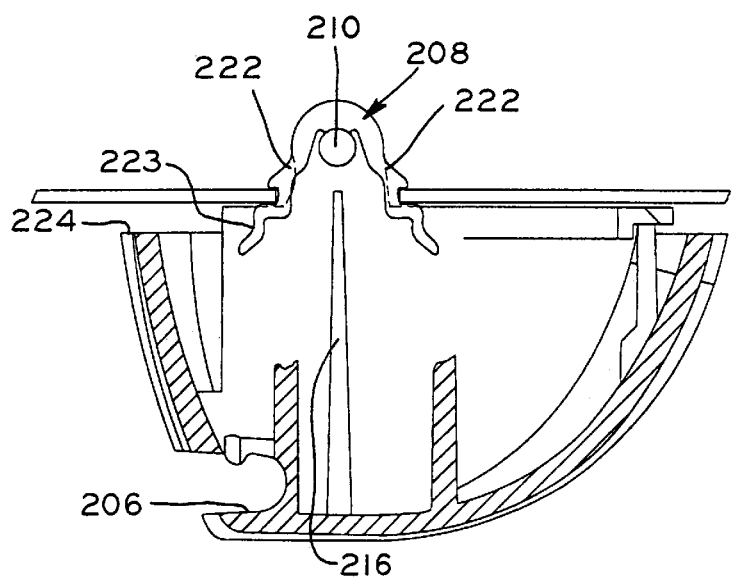

Referring now to FIGS. 34–36, lever 208 is movable to a first position (FIG. 34) wherein the lever is adapted for insertion into opening 62, similarly to the embodiments described above. As shown in FIG. 35, symmetrical arms 222 yield inwardly as the retainer clip is pushed into opening 62. Projections 218 and 220 (which form a slot therebetween) extend from lever 208 and engage the headliner and rigid panel when the retainer clip is installed as shown in FIG. 36. Advantageously, lever 208 is symmetrical, in that both arms 222 are identical, so that lever 208 could be turned 180 degrees and be installed within retainer clip 200.

Retainer clip 200 is shown installed in FIG. 36, but, like the embodiments illustrated above, retainer clip 200 includes a release member which is accessible exteriorly so that lever 208 can be disengaged and the retainer clip removed. Release member 223 is defined by lever 208 and can be accessed through access opening 224 (FIG. 33). As release member 223 is depressed with a pointed implement, arms 222 move toward one another and projections 218 and 220 on one of arms 222 disengage and the retainer clip can be removed.

Retainer clip 200 provides a tactile sensation and an audible clicking when the retainer clip is snapped into position. That is, as the rigid panel is received in the slot defined by projections 218 and 220, the installer can feel and hear that the clip is properly in place.

Figure 38:
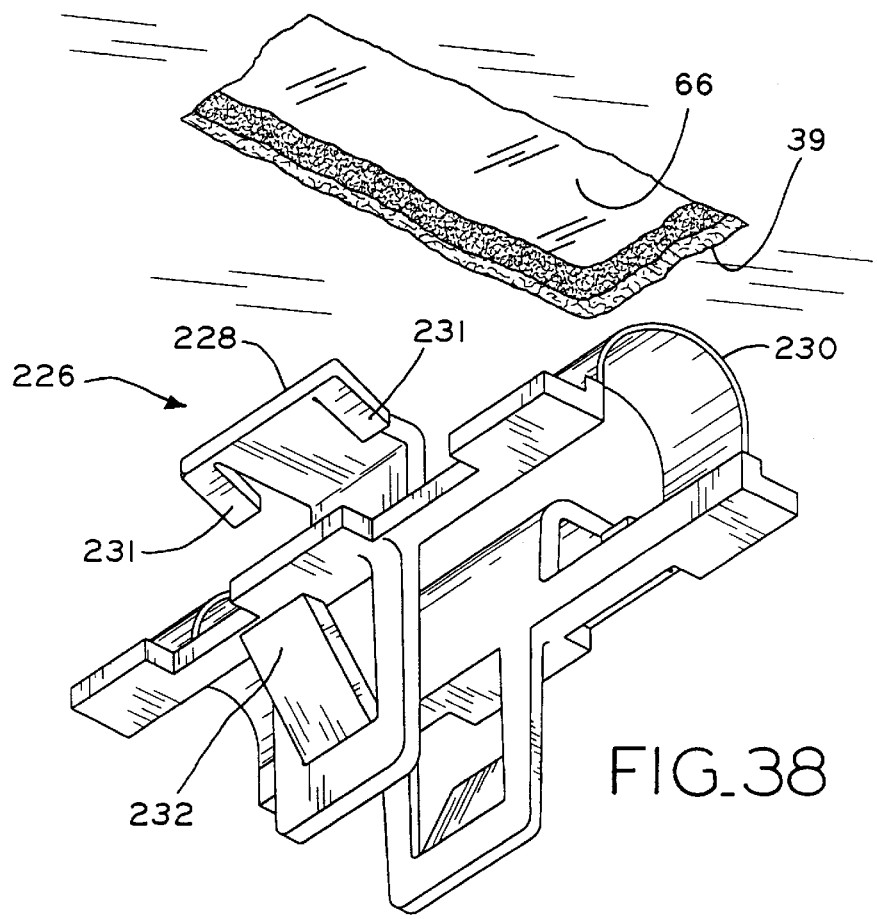
FIG. 38 is a perspective view exploded away illustrating the relationship of a transportation clip in accordance with an embodiment of the present invention and a vehicle headliner.
Figure 39:
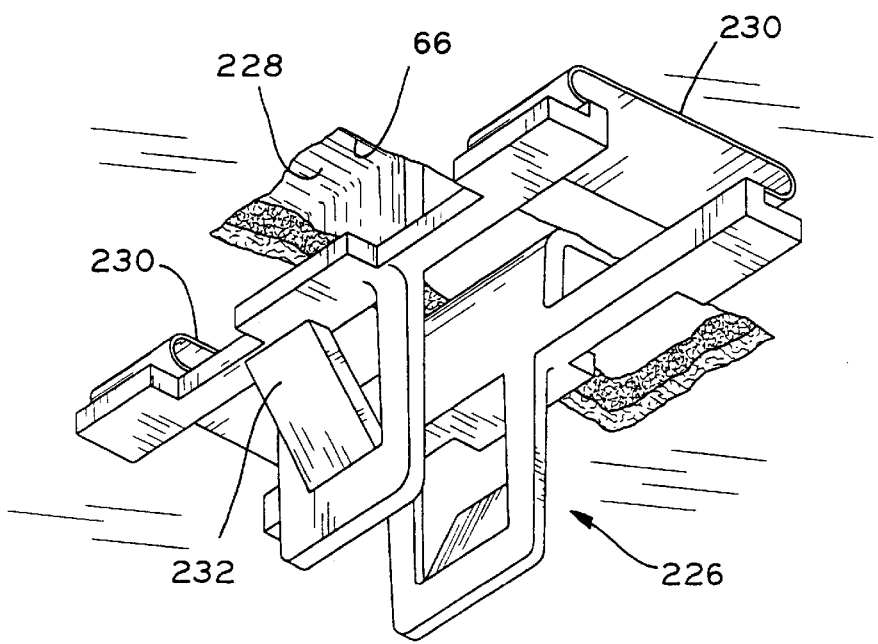
FIG. 39 is a perspective view illustrating the installation of the transportation clip of FIG. 38 into an opening provided through a headliner.
Figure 40:
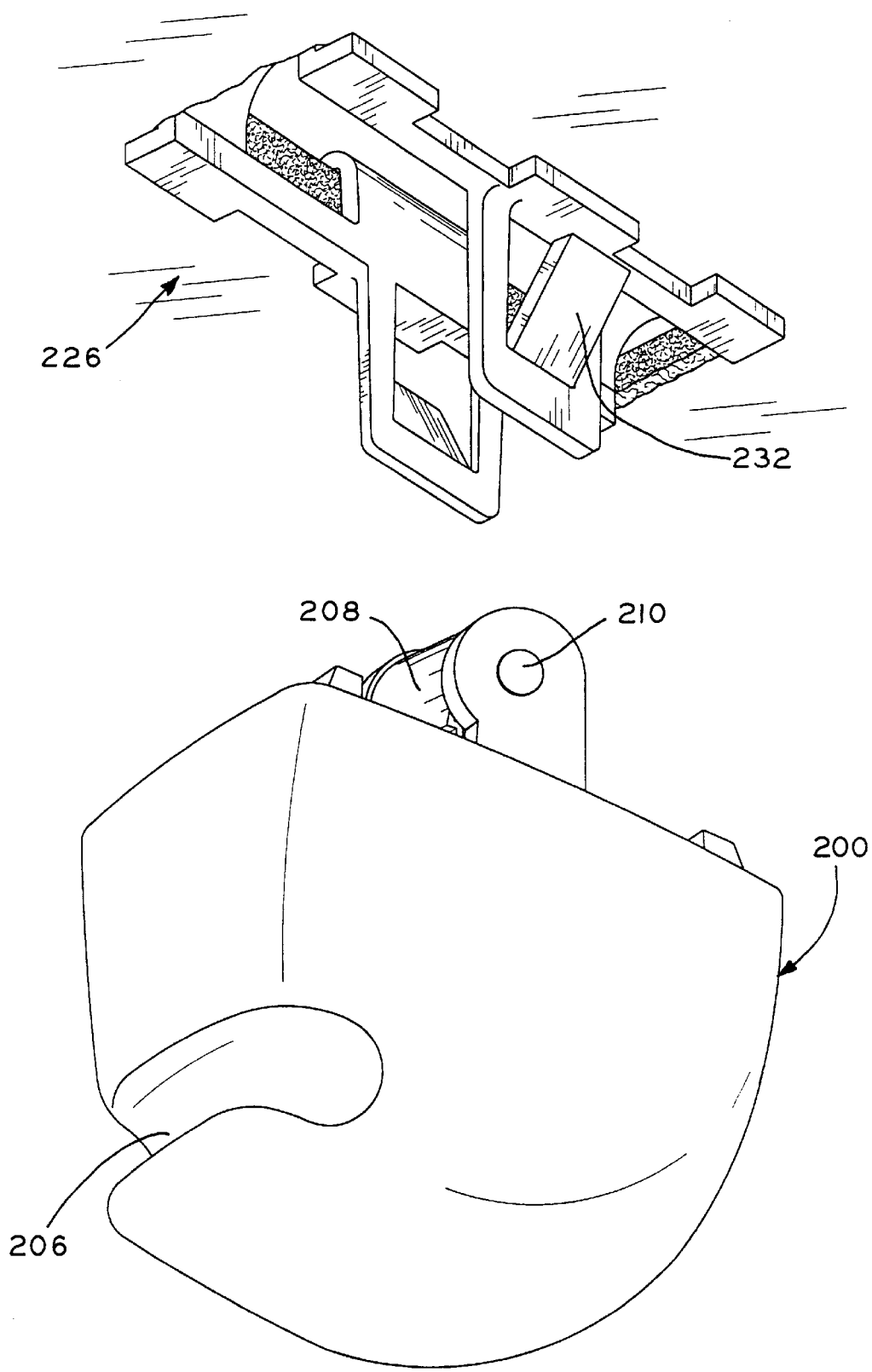
FIG. 40 is a perspective view illustrating the transportation clip of FIGS. 38 and 39 fully installed and also illustrating, exploded away, the relationship of the retainer clip to the transportation clip.
Figure 41:
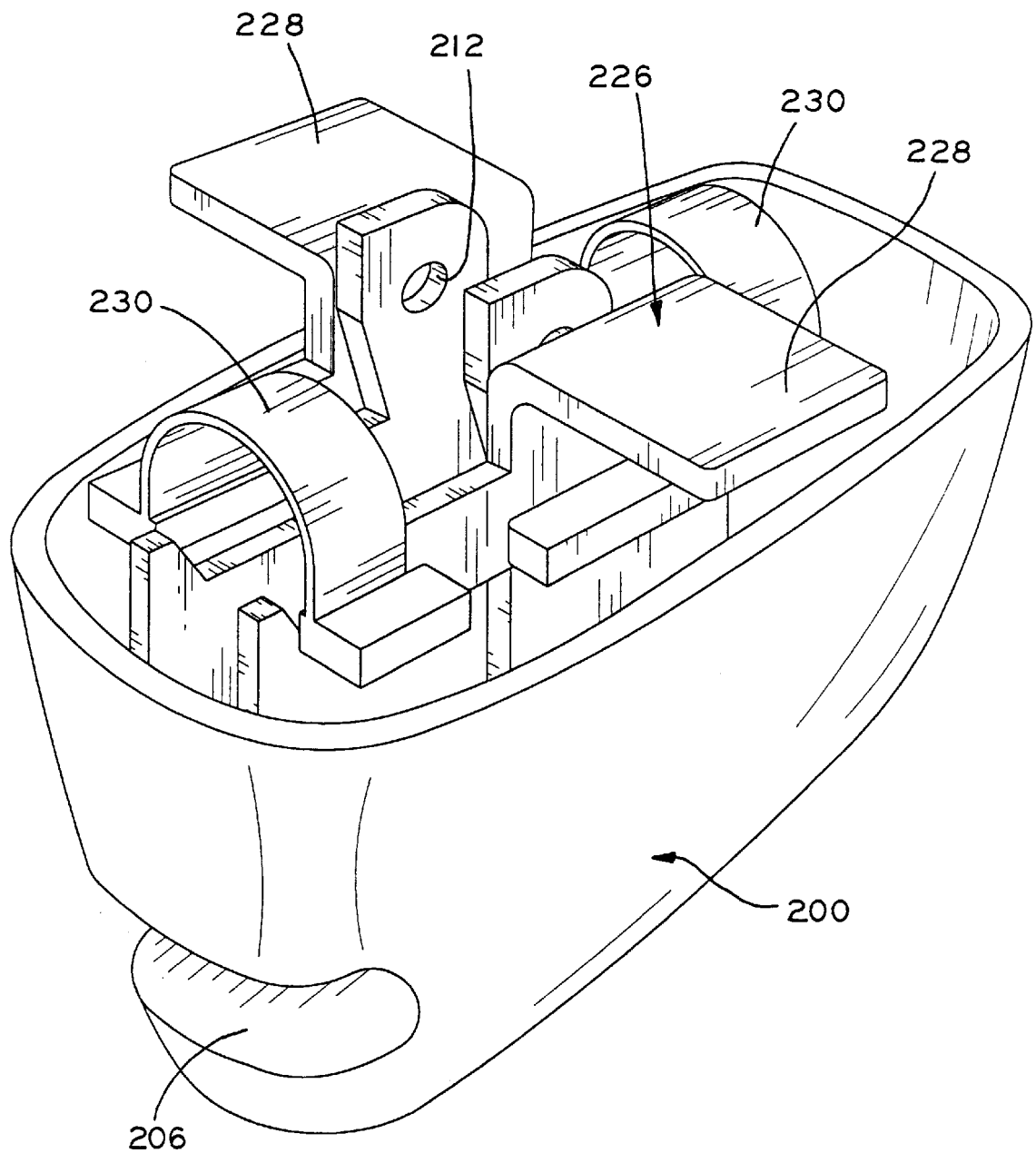
FIG. 41 is a perspective view illustrating the transportation clip and the retainer clip in the installed position.

With reference to FIGS. 38–43, another embodiment of a transportation clip is illustrated. Transportation clip 226 can be "pre-installed" into opening 66 in headliner 39 by positioning flange members 228 of transportation clip 226 in alignment with headliner opening section 66 as shown in FIG. 38. As shown in FIG. 39, transportation clip 226 is then pressed against headliner 39 which causes spring-like loop members 230 to compress. Transportation clip 226 is then rotated within headliner opening section 66 to the position shown in FIG. 40 where it is hooked to the headliner in a "pre-installation" position. Loop members 230 spring back to their initial shape after the transportation clip is positioned in the pre-installed position and help secure the transportation clip in the opening. That is, the semi-circular shape of loop members 230 allows loop members 230 to engage the opening and prevent the transportation clip from being removed. Further, finger members 231 press down against the headliner to more firmly secure the transportation clip thereto. Transportation clip 226 engages retainer clip 200 in the pre-installation position so that a headliner module can be transported with the retainer clip connected thereto.

Figure 42:
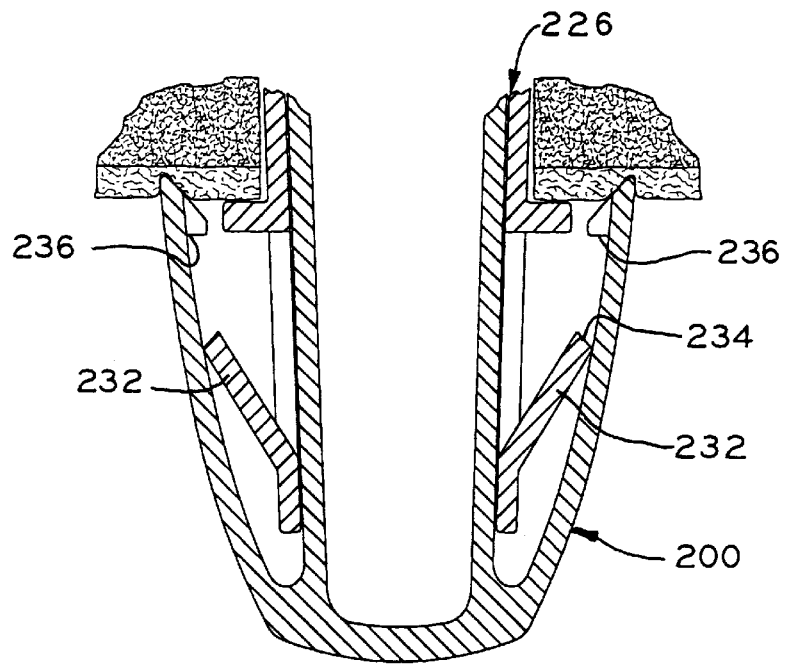
FIG. 42 is a cross sectional view illustrating the retainer clip and transportation clip in accordance with an embodiment of the present invention in an installed position.
Figure 43:
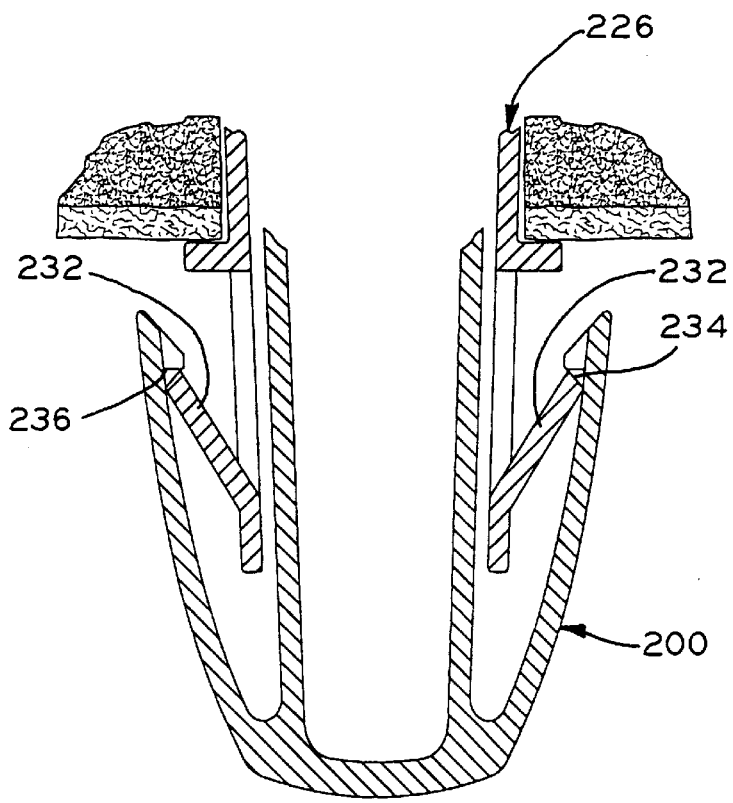
FIG. 43 is a cross sectional view of the retainer clip and a transportation clip in accordance with an embodiment of the present invention shown in a pre-installation position.

The engagement of retainer clip 200 with transportation clip 226 in both the pre-installation and installed positions can be appreciated with reference to FIGS. 42 and 43. As shown in FIG. 43, transportation clip 226 includes web members, or catch members 232, having ends 234 thereof which extend into recesses 236 formed on opposite sides of retainer clip 200. In this pre-installation position, retainer clip 200 is connected to transportation clip 226 and transportation clip 226 is hooked to headliner 39 by means of flange members 228 as shown in FIG. 43. The relationship of the retainer clip to the transportation clip in the installed position can be seen in FIG. 41. Conveniently, the transportation clip 226 is concealed in the final installation and need not be removed. Thus, assembly time and material disposal are reduced.

Figure 46:
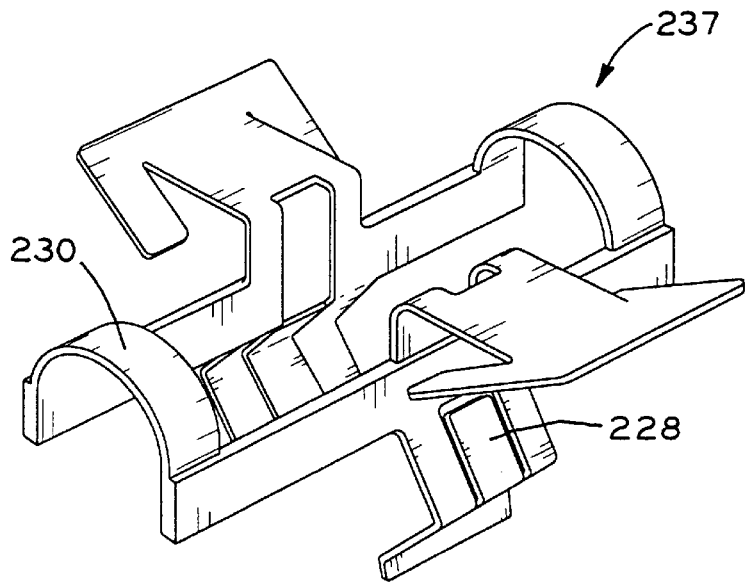
FIG. 46 is a perspective view of the transportation clip of FIG. 44.
Figure 45:
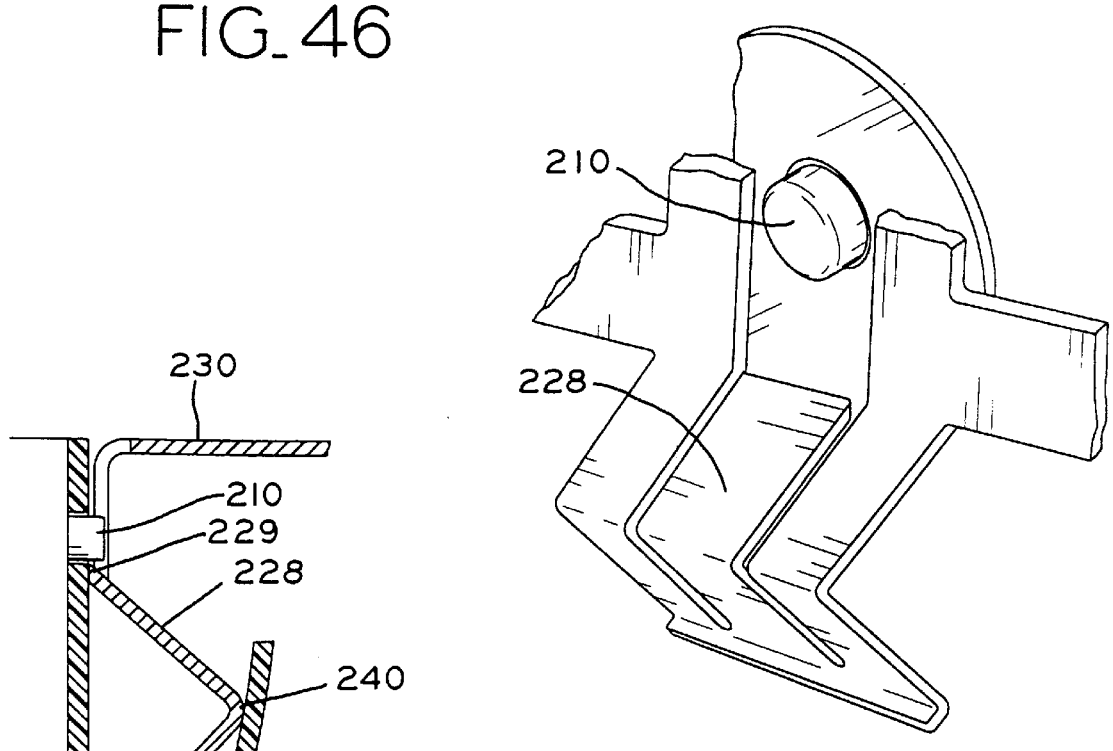
FIG. 45 is a fragmentary perspective view illustrating the relationship between the trunnion of the beam member of the retainer clip and the transportation clip.
Figure 44:
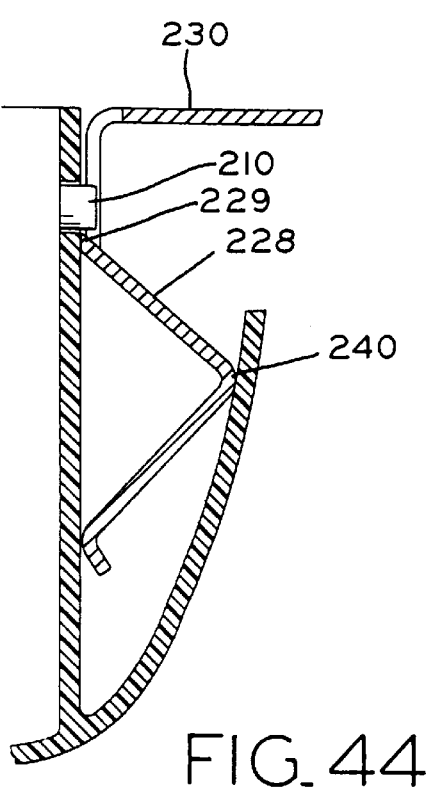
FIG. 44 is a fragmentary sectional view showing an alternate engagement mechanism between the transportation clip and retainer clip in accordance with an embodiment of the present invention.

In some applications, it may be desirable to eliminate the recess 236 shown in FIGS. 42 and 43 so that the inside of the retainer clip body can be more simply manufactured. An alternate embodiment of a transportation clip 237 which eliminates the need for the recess on the retainer clip is shown in FIGS. 44–46. As shown in FIG. 44, end 229 of catch member 238 engages the trunnion, or peg 210, in the pre-installation to hold the retainer clip to the headliner. The elbow 240 of catch member 238 is biased against the retainer clip body as shown in FIG. 44 to produce secure engagement of the retainer clip. When the retainer clip is pushed upwardly, catch member 228 slides downwardly relative to the retainer clip as shown in FIG. 45 to the installed position.

With reference to FIG. 42, when retainer clip 200 is pushed upwardly into the opening defined by the headliner and panel, transportation clip 226 is forced downwardly into retainer clip 200. That is, ends 234 disengage from recesses 236 and slide along the retainer clip body. Meanwhile, the lever of the retainer clip engages the rigid panel, as described hereinabove with reference to the first embodiment.

Figure 47:
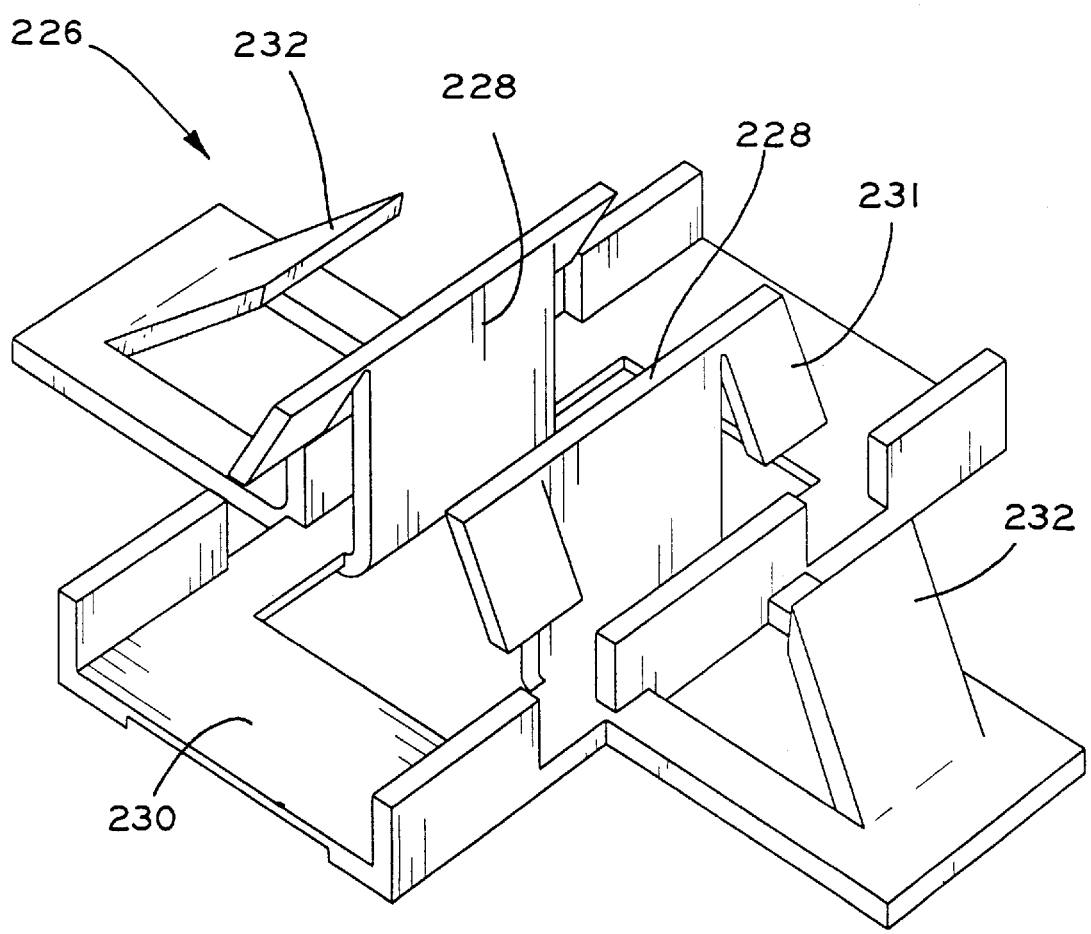
FIG. 47 is a perspective view of the transportation clip of FIG. 38 before the transportation clip is formed or bent into shape.

Advantageously, the transportation clip can be molded flat as shown in FIG. 47 and then formed or bent into the position shown in FIG. 38. Flat molding decreases tooling and other costs associated with manufacturing the transportation clips.

It will be appreciated that the foregoing embodiments are presented by way of illustration only, and not by way of any limitation, and that various alternatives and modifications may be made to the illustrated embodiments without departing from the spirit and scope of the invention. For example, the above-disclosed embodiments describe a retainer clip for releasably receiving a rod of a sun visor. However, it can be appreciated that the invention could easily be adapted to other interior vehicle components, such as the hooks conventionally installed above the rear doors for hanging coats and the like.

What is claimed is:

1. An automobile interior assembly, comprising:

a ceiling panel;

a sun visor assembly, said sun visor assembly including a rod;

a retainer clip releasably secured to said ceiling panel, said retainer clip defining a notch adapted to receive said rod therein; and said retainer clip including a release member pivotably connected thereto, said release member accessible exteriorly of said retainer clip, whereby engagement of said release member disengages said retainer clip from said ceiling panel.

2. The interior assembly of claim 1, wherein said retainer clip further comprises a lever pivotably connected thereto, said lever securing said retainer clip to said ceiling panel.

3. The interior assembly of claim 2, wherein said lever defines said release member.

4. The interior assembly of claim 2, wherein said ceiling panel defines an opening therethrough, said lever engaging said ceiling panel proximate an edge of said opening.

5. The interior assembly of claim 4, wherein said lever is concealed by said retainer clip and said ceiling panel.

6. A retainer clip for use in an automobile, the automobile including a sun visor assembly having a rod, a rigid panel having a headliner adjacent thereto, and an opening extending through the panel and headliner for insertion of said retainer clip, said retainer clip comprising:

a retainer clip body defining an edge adapted to abut the headliner, said retainer clip further defining a notch adapted to receive the rod therein; and a release member pivotably connected to said retainer clip, whereby said release member is positionable in a first position for insertion into the opening, and a second position for engagement with the rigid panel thereby securing said retainer clip.

7. The retainer clip of claim 6, wherein said release member is accessible from the exterior of said retainer clip, whereby said retainer clip can be removed.

8. The retainer clip of claim 7, wherein said retainer clip body forms an access hole therethrough for accessing said release member.

9. The retainer clip of claim 6, wherein said release member comprises a lever pivotably connected thereto, said lever securing said retainer clip to said rigid panel.

10. The retainer clip of claim 9, wherein said lever further includes a slot adapted to receive a portion of the rigid panel proximal to the opening.

11. The retainer clip of claim 10, further comprising said slot being defined by a pair of projections, at least one of said projections being adapted to engage the rigid panel.

12. The retainer clip of claim 9, wherein said retainer clip body further comprises a beam member disposed therein, said lever being pivotably attached to said beam member.

\* \* \* \* \*